United States Patent
Lundvall

(10) Patent No.: US 9,082,024 B2
(45) Date of Patent: Jul. 14, 2015

(54) OPTICAL DEVICE READING METHOD AND DEVICE

(75) Inventor: Axel Lundvall, Solna (SE)

(73) Assignee: Rolling Optics AB, Solna (SE)

(*) Notice: Subject to any disclaimer, the term of this patent is extended or adjusted under 35 U.S.C. 154(b) by 60 days.

(21) Appl. No.: 13/805,829

(22) PCT Filed: Jun. 20, 2011

(86) PCT No.: PCT/SE2011/050793
§ 371 (c)(1),
(2), (4) Date: Jan. 14, 2013

(87) PCT Pub. No.: WO2011/162695
PCT Pub. Date: Dec. 29, 2011

(65) Prior Publication Data
US 2013/0098999 A1    Apr. 25, 2013

(30) Foreign Application Priority Data

Jun. 21, 2010 (SE) .................................. 1050654

(51) Int. Cl.
| | |
|---|---|
| *G06K 19/00* | (2006.01) |
| *G06K 7/10* | (2006.01) |
| *G02B 3/00* | (2006.01) |
| *G02B 7/02* | (2006.01) |
| *G02B 27/22* | (2006.01) |

(52) U.S. Cl.
CPC ................ *G06K 7/10* (2013.01); *G02B 3/0056* (2013.01); *G02B 7/023* (2013.01); *G02B 27/2214* (2013.01)

(58) Field of Classification Search
USPC ................... 235/435, 439, 454; 359/618, 364
See application file for complete search history.

(56) References Cited

U.S. PATENT DOCUMENTS

| | | | |
|---|---|---|---|
| 5,844,713 A * | 12/1998 | Nanba et al. ................... 359/364 |
| 2005/0275840 A1 | 12/2005 | Gui et al. | |
| 2007/0070062 A1 | 3/2007 | Boll | |
| 2007/0188862 A1 | 8/2007 | Yokosawa | |
| 2008/0290171 A1 * | 11/2008 | Vinogradov ............. 235/462.06 |
| 2009/0102179 A1 | 4/2009 | Lo | |
| 2009/0140131 A1 | 6/2009 | Utagawa | |
| 2010/0164910 A1 | 7/2010 | Tomisawa et al. | |

FOREIGN PATENT DOCUMENTS

| | | |
|---|---|---|
| CN | 1580947 A | 2/2005 |
| CN | 101563640 A | 10/2009 |
| EP | 2 631 085 A1 | 8/2013 |

(Continued)

OTHER PUBLICATIONS

Chinese Office Action issued in Chinese Application No. 201180030919 on Jun. 3, 2014.

*Primary Examiner* — Matthew Mikels
(74) *Attorney, Agent, or Firm* — Birch, Stewart, Kolasch & Birch, LLP

(57) ABSTRACT

A method for enabling reading of an optical device that has an array of focusing elements and is configured to provide a synthetic image, comprises arranging (210) of the optical device to obtain a first predetermined shape and controlling (220) of an image plane selector to select an image plane at a first position relative a surface of the optical device. An observable two-dimensional section of the synthetic image taken at the selected image plane is thereby provided. A device for enabling reading of an optical device is also disclosed.

15 Claims, 13 Drawing Sheets

(56) References Cited

FOREIGN PATENT DOCUMENTS

| | | |
|---|---|---|
| JP | 02-068720 A | 3/1990 |
| JP | 8-240786 A | 9/1996 |
| JP | 2003-346077 A | 12/2003 |
| JP | 2007-004471 A | 1/2007 |
| JP | 2007-514188 A | 5/2007 |
| JP | 2007-212794 A | 8/2007 |
| JP | 2007-534005 A | 11/2007 |
| WO | WO 03/061983 A1 | 7/2003 |
| WO | WO 2005/052650 A2 | 6/2005 |
| WO | WO 2005/106601 A2 | 11/2005 |
| WO | WO 2007/018111 A1 | 2/2007 |
| WO | WO 2008/008635 A2 | 1/2008 |
| WO | WO 2009/085003 A1 | 7/2009 |
| WO | WO 2010/057831 A1 | 5/2010 |

* cited by examiner

OPTICAL DEVICE READING METHOD AND DEVICE

TECHNICAL FIELD

The present invention relates in general to optical devices and in particular to optical devices associated with synthetic images and methods associated therewith.

BACKGROUND

Synthetic images of different kinds have during a long time been used for many different purposes. One typical example of applications of synthetic images is as authentication purposes. A synthetic image is given different properties that are difficult to forge, but which are still easily noticed by the viewer's eyes and/or a simple assisting device. A very much used example of a system that has the ability to provide such synthetic images is a so-called Moiré device. In the two-dimensional version of such a device, a large multitude of small focussing elements are arranged in an array. An image plane is provided with optically distinguishable icons or geometrical features which are imaged through a respective focussing element towards a viewer's eyes, where the human brain creates a composite synthetic image.

Typical examples of prior-art systems that have been used or can be used for e.g. authentication purposes can e.g. be found in the published international patent applications WO 03/061983 or WO 2009/085003.

The published US patent application US 2009/0102179 A1 discloses a counterfeit proof label having an optically concealed progressive shifting security safety symbol for quick visual identification utilizing a mobile phone for online verification. In the published International Patent Application WO 2008/008635 A2 a micro-optic security and image presentation system is disclosed. In the published US patent application US 2009/0140131 A1 an image input apparatus, a photodetection apparatus and an image synthesis method are disclosed.

An important benefit for using synthetic images as authentication devices is that they are difficult to copy. A problem that has been discussed for a while is the problem for an un-trained viewer to be able to distinguish between a correct image and a forged one. The properties of the image have to be very distinct and easily distinguishable from different kinds of forged images. It can for instance be difficult for an untrained viewer to distinguish an image with a true three-dimensional appearance from an image having certain 3D-like properties. A request is thus to provide optical devices producing images than may be influenced to give large and easily observable changes when handled according to a predetermined treatment.

SUMMARY

An object with the present invention is to utilize the three-dimensional information space of synthetic images and to achieve methods and assisting devices for detecting such information. The above object is achieved by methods and devices according to the enclosed independent claims. Preferred embodiments are defined by the enclosed dependent claims. In general words, in a first aspect, a method for enabling reading of an optical device, having an array of focusing elements and being configured to provide a synthetic image, comprises arranging of the optical device to obtain a first predetermined shape and controlling of an image plane selector to select an image plane at a first position relative a surface of the optical device. The image plane selector is a diffusing screen. The controlling comprises moving of the diffusing screen to the image plane at the first position above the surface of the optical device. An observable two-dimensional section, flat or curved, of the synthetic image taken at the selected image plane is thereby provided.

In a second aspect, a device for enabling reading of an optical device, having an array of focusing elements and being configured to provide a synthetic image, comprises an image plane selector, a support structure and an image plane controller. The support structure is arranged for supporting the image plane selector relative to the optical device arranged in a first predetermined shape. The image plane controller is configured to control an image plane selector to select an image plane at a first position relative a surface of the optical device. The image plane selector comprises a diffusing screen, whereby the image plane is the plane of the diffusing screen. An observable two-dimensional section of the synthetic image taken at the selected image plane is thereby provided.

In a third aspect, a distance meter for finding a predetermined distance from an object surface comprises a device for enabling reading of an optical device according to the second aspect and an indicator configured to indicate the first position.

In a fourth aspect, an authenticity verifier comprises a device for enabling reading of an optical device according to the second aspect.

In a fifth aspect, an information decoder comprises a device for enabling reading of an optical device according to the second aspect, an image detector, arranged to record a two-dimensional section of the synthetic image being provided at the selected image plane and an image interpreter, configured to interpret coded information comprised in the recorded two-dimensional section of the synthetic image.

One advantage with the present invention is that the three-dimensional space is utilized for information selection. Other advantages are further described in connection with the different embodiments described further below.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the present disclosures, equal or directly corresponding features in different figures and embodiments will be denoted by the same reference numbers.

In the present invention, the full three-dimensional space is utilized for storing image information. By providing a simple reading technique for selecting two-dimensional part images of the three-dimensional space, the information can easily be utilized for different kinds of applications. The base for this approach is the property of different kinds of synthetic images to provide three-dimensional or quasi-three-dimensional image properties.

In order to fully understand the technological benefits, we will start with a summary of some examples of synthetic images having three-dimensional or at least quasi-three-dimensional properties.

A system providing a synthetic image may comprise a two-dimensional array of focussing elements, for example a two-dimensional array of spherical lenses. The spherical lenses are provided in an interface, typically a surface, of a polymer foil. At another interface of the polymer foil, optically distinguishable icons are provided. When viewing the two-dimensional array of focussing elements, each focussing element will provide an enlarged image of a small part of the surface with the optically distinguishable icons, e.g. geometrical structures or printed patterns. The icons are typically provided by printing or embossing, but may also be provided by e.g. etching or exposing for radiation. The viewer will combine these small part images to a composed synthetic image. Different parts of the surface with the icons are imaged when viewing the two-dimensional array of focussing elements from different angles. By configuring the icons in a particular manner, different kinds of images and optical effects can be achieved.

Figure 1A:
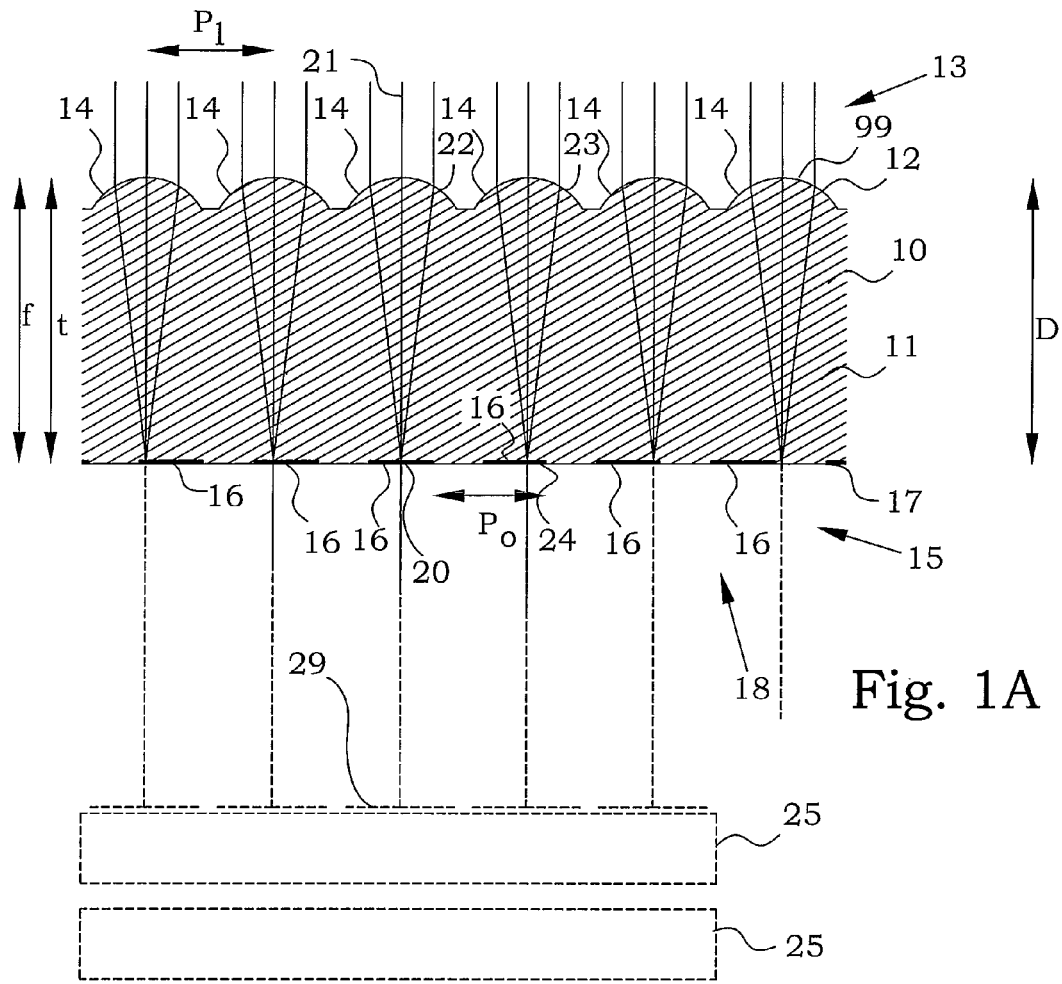
FIGS. 1A-B are schematic illustrations of optical devices giving rise to synthetic images.

FIG. 1A illustrates schematically a cross-sectional view of an example of an optical device 10 capable of producing a synthetic image. The optical device 10 comprises a polymer foil 11 of thickness t. At a first side 12 of the polymer foil 11, a first array 13 of embossed microlenses 14 are provided at a surface. The embossed microlenses 14 are here the utilized focussing elements 99. The first array 13 is in this example a periodic two-dimensional array, which becomes a one-dimensional array in the cross-sectional view of FIG. 1A, with a periodicity $P_I$ in the illustrated cross-section.

The polymer foil 11 of the present example is also provided with a second array 15 of identical icons 16. The icons 16 constitute an interface between portions having differing optical properties. In the present example, the icons 16 are provided at a second side 17 of the polymer foil 11, opposite to the first side 12. The icons 16 in the present example therefore become an interface between the interior of the polymer foil 11 and the space 18 behind the polymer foil 11. The differences in optical properties of the polymer foil 11 and the space 18 makes it possible to distinguish the shape of the icons 16. The second array 15 is in this example also a periodic two-dimensional array and has furthermore the same symmetry properties as the first array 13. A symmetry axis of the second array 15 is parallel to a symmetry axis of the first array 13. In other words, the first and second arrays 13, 15 are essentially aligned by their symmetry axes. If, for example, both arrays exhibit a hexagonal pattern, the close-packed directions are aligned. The second array 15 has a periodicity $P_o$, in the illustrated cross-section plane. The polymer foil 11 is essentially transparent or coloured transparent, at least between the pattern planes.

In order for the synthetic image to be present for a viewer, the periodicity $P_o$ of the second array 15 differs by a non-integer factor from the periodicity $P_I$ of the first array 13. This relation determines, as is discussed further below, the magnifying factor. Furthermore, the second array 15 is provided at a distance D from the first side 12 of the polymer foil 11 that is close to a focal length f of the embossed microlenses 14. In the present example, having the icons 16 at the second side 17 of the polymer foil 11, this puts a requirement on that the average thickness of the polymer foil 11 should be essentially equal to the focal length f. However, the distance between the first and second arrays 13, 15 does not have to be exact equal to the focal length f.

As mentioned above, the magnification is dependent on the relative sizes of the periodicities $P_I$ and $P_o$. In FIG. 1A, the periodicity $P_o$ of the second array is slightly smaller than the periodicity $P_I$ of the first array, i.e.:

$$P_o < P_I. \quad (1)$$

A specific spot 20 at one of the icons 16 is in the illustrated example situated exactly below, and furthermore in the focal point of one microlens 22 of the embossed microlenses 14. This means that light originating from the spot 20 ideally can travel through the polymer foil 11 and be refracted in the microlens above into a parallel beam of light rays 21. In a preferred embodiment, the spot 20 has a certain extension and is to be considered as a small area around the spot 20. The diameter of the imaged area around the spot 20 is ideally equal to the difference in period between the microlens array and the icon array. A spectator watching the first side 12 of the polymer foil 11 will experience the optical characteristics of the area around spot 20 spread out over the entire microlens 22, i.e. an enlarged part image 29 will be experienced. The microlens 23 will in the same manner provide another enlarged part image 29 of an area around spot 24 of another of the icons 16. Since there is a slight mismatch in periodicity, the area around spot 24 does not correspond exactly to the area around spot 20, but instead to an area slightly beside. By having a large number of microlenses 14 and icons 16, the areas that are imaged will ideally origin from every area of the icons 16. A spectator will thus experience a synthetic image 25 composed by the small part images 29 corresponding to a respective microlens 14. The part images 29 will together be experienced by the eye as a magnified synthetic image 25 of the icon 16.

From simple geometrical reasoning, it is found that a periodicity $P_i$ of an image is:

$$P_i = \frac{P_I^2}{(P_I - P_o)} \quad (2)$$

where $d_l$ is a diameter of a microlens. A magnification M, as experienced when the optical device is view from an infinite distance, is thus given by:

$$M = \frac{P_i}{P_o}. \quad (3)$$

Expressed in terms of a factor F between the periodicity $P_o$ of the second array and the periodicity $P_l$ of the first array:

$$F = \frac{P_o}{P_l} \quad (4)$$

the magnification becomes:

$$M = \frac{1}{F - F^2}. \quad (5)$$

One may notice that the magnification becomes very large when the factor F comes close to unity. For a factor equal to unity, the magnification becomes infinite, which often is not very useful, since only one single spot at the icons then will be visible. In order to get a useful image, it is thus necessary that the factor F differs from unity, and, as will be discussed further below, that the factor F differs from any integer value, i.e. F has to be a non-integer factor.

However, in order to achieve a large magnification, the factor should preferably be close to 1. In the example of FIG. 1A, the factor is smaller than 1, since $P_o<P_l$. The magnification thus has a positive value.

Figure 1B:
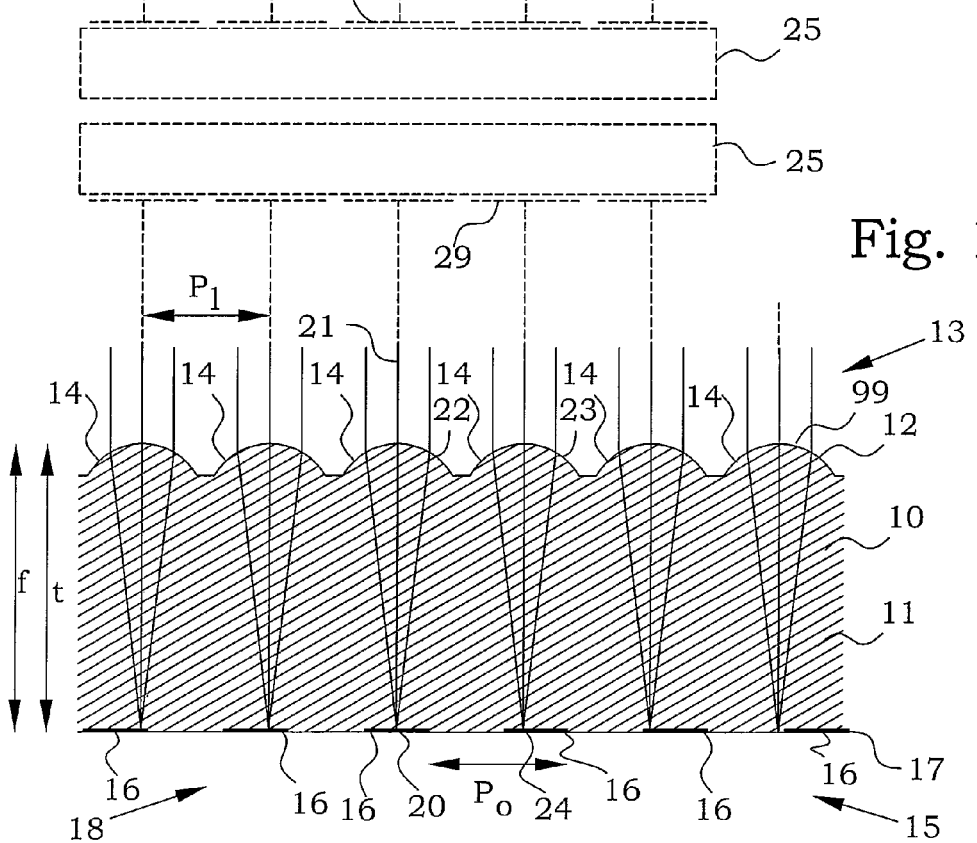

In FIG. 1B, another example of an optical device 10 according to the present invention is illustrated. Here, $P_l<P_o$, the factor F becomes larger than 1, and consequently, the magnification M becomes negative. The respective part images 29 are as above small images of areas around respective spots 20, 24. These part images 29 are created as positively magnified images of the areas around the spots 20, 24. However, due to the mismatch in periodicity, the part images 29 are here ordered in an opposite order as compared to FIG. 1A. However, if each part image 29 is small enough, the eye will anyway create a synthetic image 25 where a general trend of the original icon 16 is present. In other words, an entire synthetic image 25 produced by the example of FIG. 1B will appear for the eye as an inverted synthetic image 25 of the icon 16, while the individual part images 29 are non-inverted images of limited areas around different spots 20, 24 at the icons 16. As will be discussed further below, the synthetic image 25 will also in this case appear to be positioned in front of the polymer foil 11.

Figure 2A:
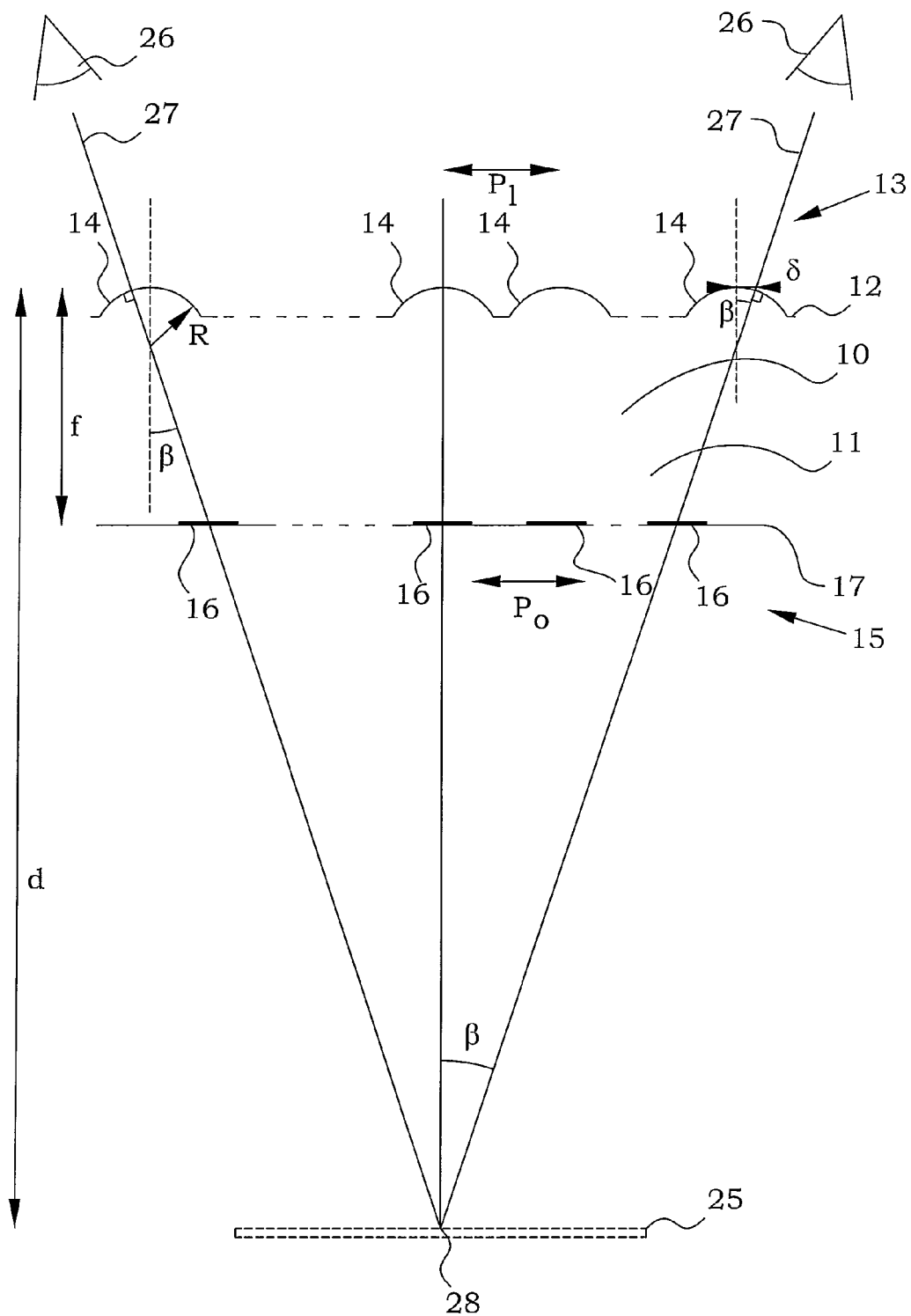
FIGS. 2A-B are schematic illustrations of apparent depth and height in optical devices according to FIGS. 1A-B.

The design parameters of the polymer foil 11 have further impacts on the optical properties. Besides the property of magnifying the icons, the polymer foil 11 also provides a synthetic three-dimensional experience. FIG. 2A illustrates the experienced depth of the image. In this embodiment, the factor F is smaller than 1. The eyes 26 of a spectator are focussed on one spot 28 on the imaginary image 25. For simplicity, the spot 28 is situated in the middle between the eyes 26. The paraxial rays 27 to the eyes pass different microlenses 14 at a right angle but comes from a corresponding spot at the icons 16. The imaginary image, however, is produced at a depth of d. An angle β of the rays 27 is easily defined in different ways in different parts of the figure by different design parameters. In the bottom part of the figure, it is seen that:

$$\tan\beta = \left(\frac{nP_l + \delta}{d}\right) \quad (6)$$

where δ is the distance between the centre of a microlens 14 and the point in a same plane where the ray 27 intersects the lens surface, and n is an integer. Similarly, as seen in the upper left part of FIG. 2A, the angle β can also be defined as:

$$\tan\beta = \left(\frac{n(P_l - P_o)}{f - R}\right) \quad (7)$$

where R is a radius of curvature of the microlenses 14. Finally, as seen in the upper right part of FIG. 2, the angle β can also be defined as:

$$\tan\beta = \left(\frac{\delta}{R}\right). \quad (8)$$

By combining (6)-(8) one finds that the image depth d becomes:

$$d = \frac{f - R}{\left(1 - \frac{P_o}{P_l}\right)} + R \quad (9)$$

or in terms of the factor F:

$$d = \frac{f - R}{(1 - F)} + R \quad (10)$$

Here it is also easily seen that the second term typically is negligible, and that a factor F close to unity gives a large depth. The relation between focal length and lens radius is dependent on the choice of material, but is typically less important for the magnitude than the factor F, when F is close to unity. The integer n and the distance δ disappear, which proves that the depth d is constant, independent on the distance to the spectator. (However, the illustrated synthetic image 25 will be affected by the distance and is here illustrated for a non-infinite viewing distance.)

Figure 2B:
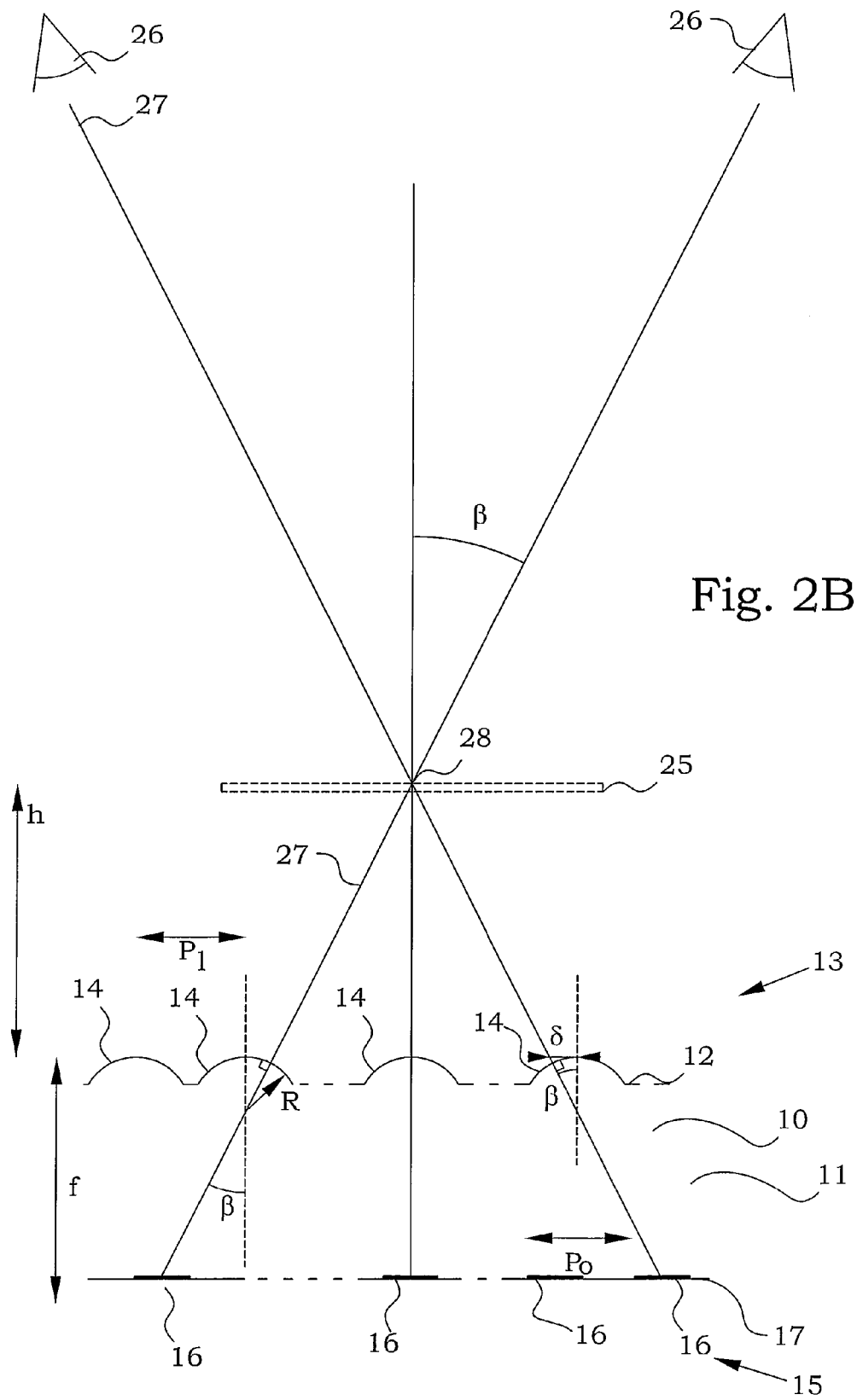

If a factor F larger than unity is utilized, the depth d becomes negative, i.e. the synthetic image appears to be situated in front of the lens surface, as seen by the spectator. This situation is illustrated in FIG. 2B. The height h at which the synthetic image 25 seems to be situated is thereby equal to the "negative" depths as defined above, i.e.:

$$h = \frac{f - R}{(F - 1)} + R \quad (11)$$

Figure 3A:
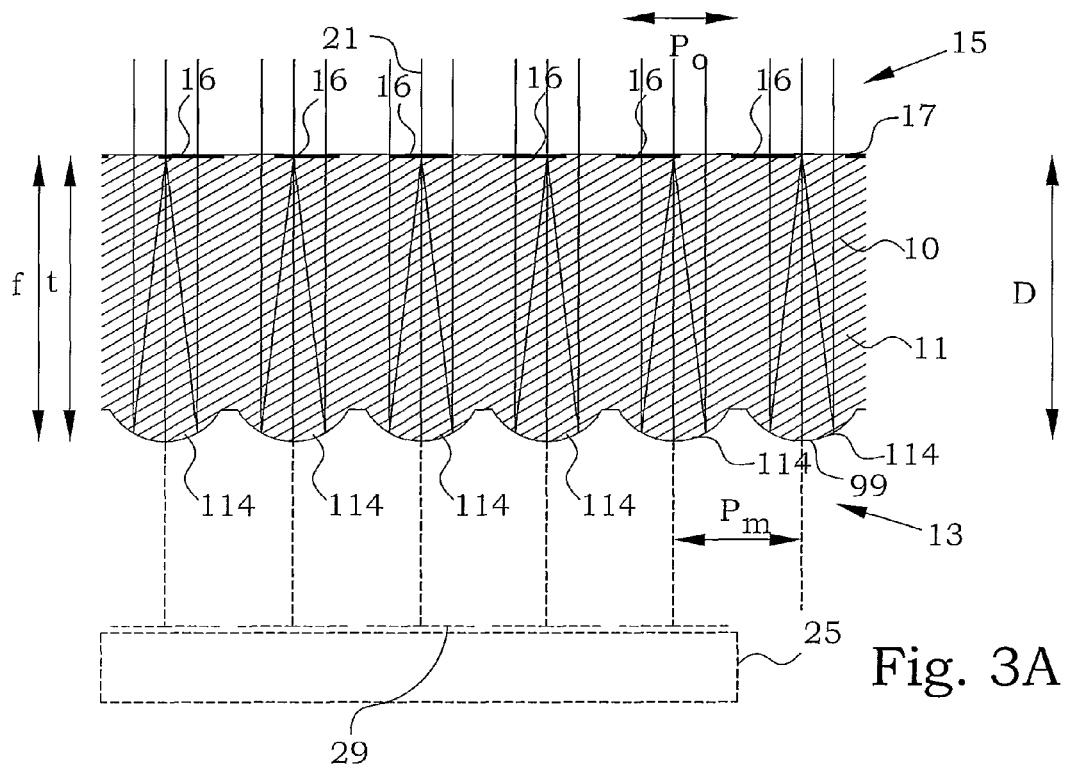
FIGS. 3A-B are schematic illustrations of other optical devices giving rise to synthetic images.

Another example of an optical device having a two-dimensional array of focusing elements and being configured to provide a synthetic image is based on curved mirrors, as illustrated in FIG. 3A. The optical device 10 in this example also comprises a polymer foil 11 of thickness t. In this example, the two-dimensional array of focussing elements 99 is constituted by a first array 13 of spherical mirrors 114. At a first side 12 of the polymer foil 11, a second array 15 of identical icons 16 is provided in analogy with the lens example above. The second array 15 has a periodicity $P_o$, in the illustrated cross-section plane. The first array 13 of spherical mirrors 114 are provided at a surface of the second side 17 of the polymer foil. The focus length f of the mirrors is approximately equal to the thickness t of the polymer film. The first array 13 has a periodicity $P_m$ in the illustrated cross-section. The polymer foil 11 is essentially transparent or coloured transparent, at least between the pattern planes.

Rays leaving the icons 16 towards the spherical mirrors 114 will be reflected in the spherical mirrors 114 into a beam of parallel rays. The rays will refract at the first side 12 of the polymer foil 11, but will still be a beam of parallel beams. Due to the differences in periodicity between $P_m$ and $P_o$, a synthetic enlarged image will also here be produced. The same reasoning as in the lens case can be performed and the equation (5) is valid also in this case.

Figure 3B:
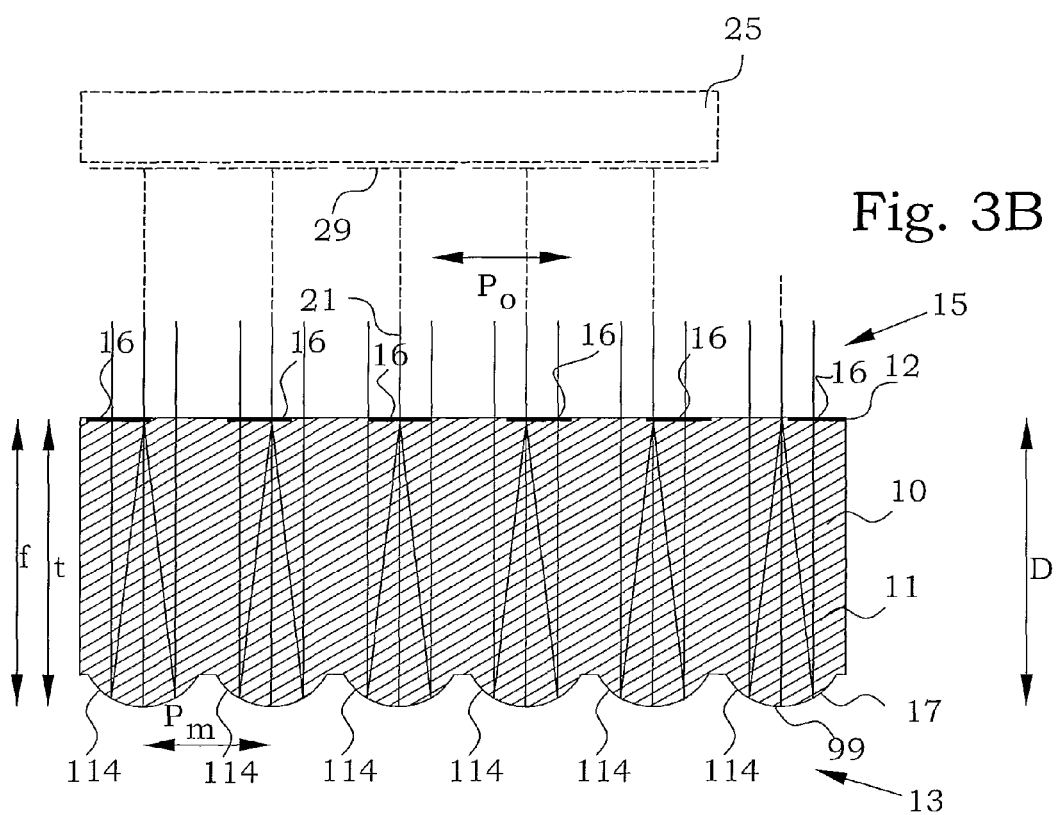

In FIG. 3B, a situation where an inverted image is provided at a height h above the foil is illustrated in analogy with FIG. 1B.

Figure 4A:
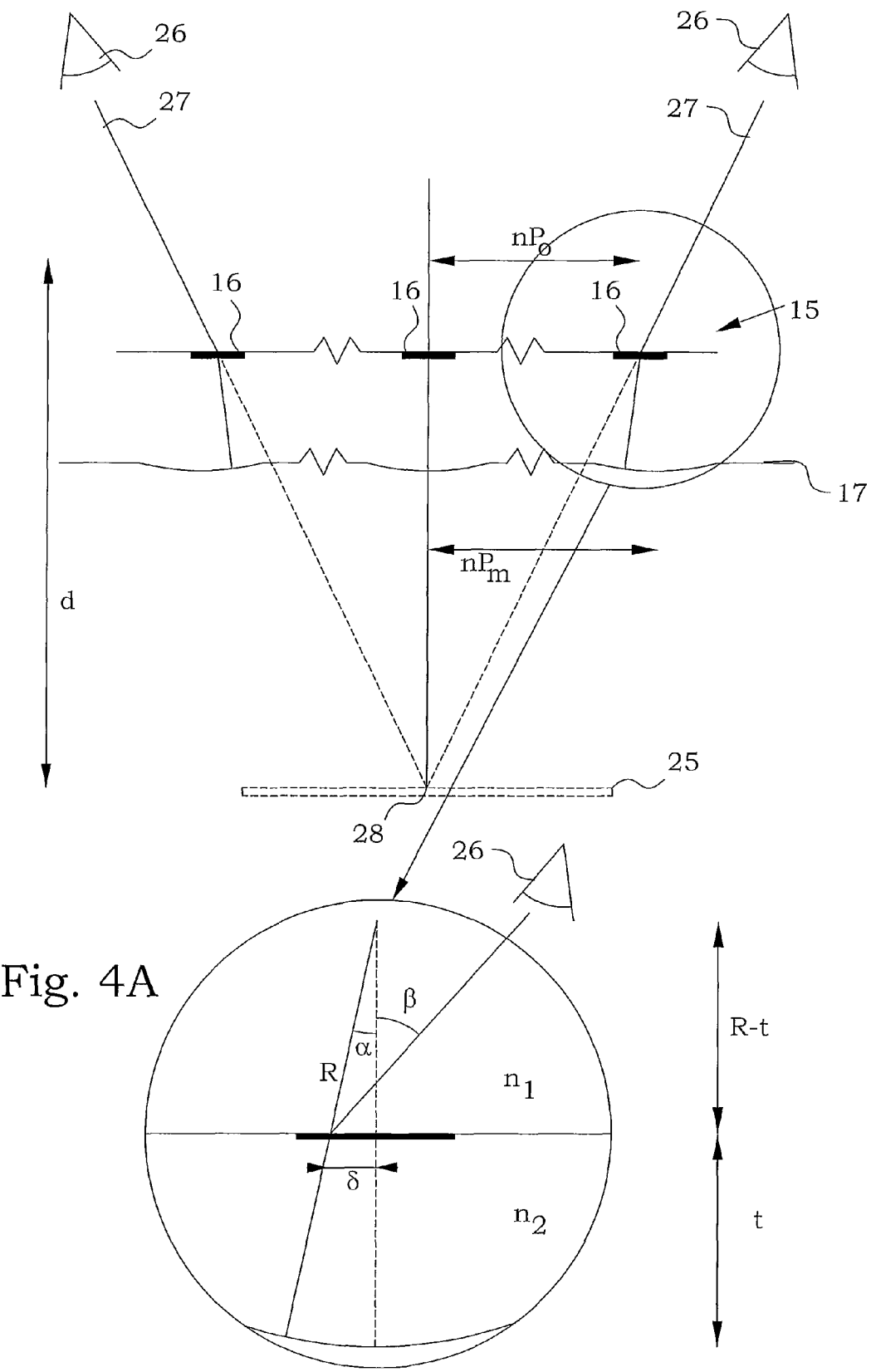
FIGS. 4A-B are schematic illustrations of apparent depth and height in optical devices according to FIGS. 3A-B.

Due to the refraction in the surface of the polymer foil, the apparent depth of height at which the synthetic image is seen is somewhat different from the lens case. With reference to FIG. 4A, a ray that is refracted in a surface follows Snell's law:

$$\frac{\sin\beta}{\sin\alpha} = \frac{n_2}{n_1}. \tag{12}$$

For an air interface, $n_1$ is equal to 1. The angle $\beta$ can be defined by:

$$\tan\beta = \frac{nP_o}{d}, \tag{13}$$

and since for a general angle $\Theta$ $$\tan\Theta = \frac{\sin\Theta}{\cos\Theta} \tag{14}$$

the angle $\beta$ can also be defined by the relation:

$$\sin\beta = \frac{nP_o}{d}\cos\beta, \tag{15}$$

The angle $\alpha$ can be defined by:

$$\tan\alpha = \frac{\delta}{R-t}, \tag{16}$$

and since:

$$\delta = n(P_m - P_o) \tag{17}$$

the result becomes (in view of eq. 14):

$$\sin\alpha = \frac{n(P_m - P_o)}{R-t}\cos\alpha. \tag{18}$$

Combining (12), (15) and (18) will give the depth as:

$$d = \frac{P_o(R-t)\cos\alpha}{n_2(P_m - P_o)\cos\beta}. \tag{19}$$

For small angles relative a surface normal of the optical device, the angles $\alpha$ and $\beta$ are very close to each other and the ratio between them becomes almost equal to 1. An approximate depth when the optical device is viewed from a not very shallow angle is therefore:

$$d = \frac{P_o(R-t)}{n_2(P_m - P_o)}. \tag{20}$$

Furthermore, the thickness t and the radius R of the mirror curvature are connected by:

$$t \approx f = -\frac{R}{2}. \tag{21}$$

This means that a low refractory index $n_2$ gives large depths d. Small differences in the periodicities will also give large depths, and generally a large icon periodicity $P_o$ will also give a large depth. However, there is no benefit of using a polymer foil with a large refractory index $n_2$ if a large depth is to be achieved.

Figure 4B:
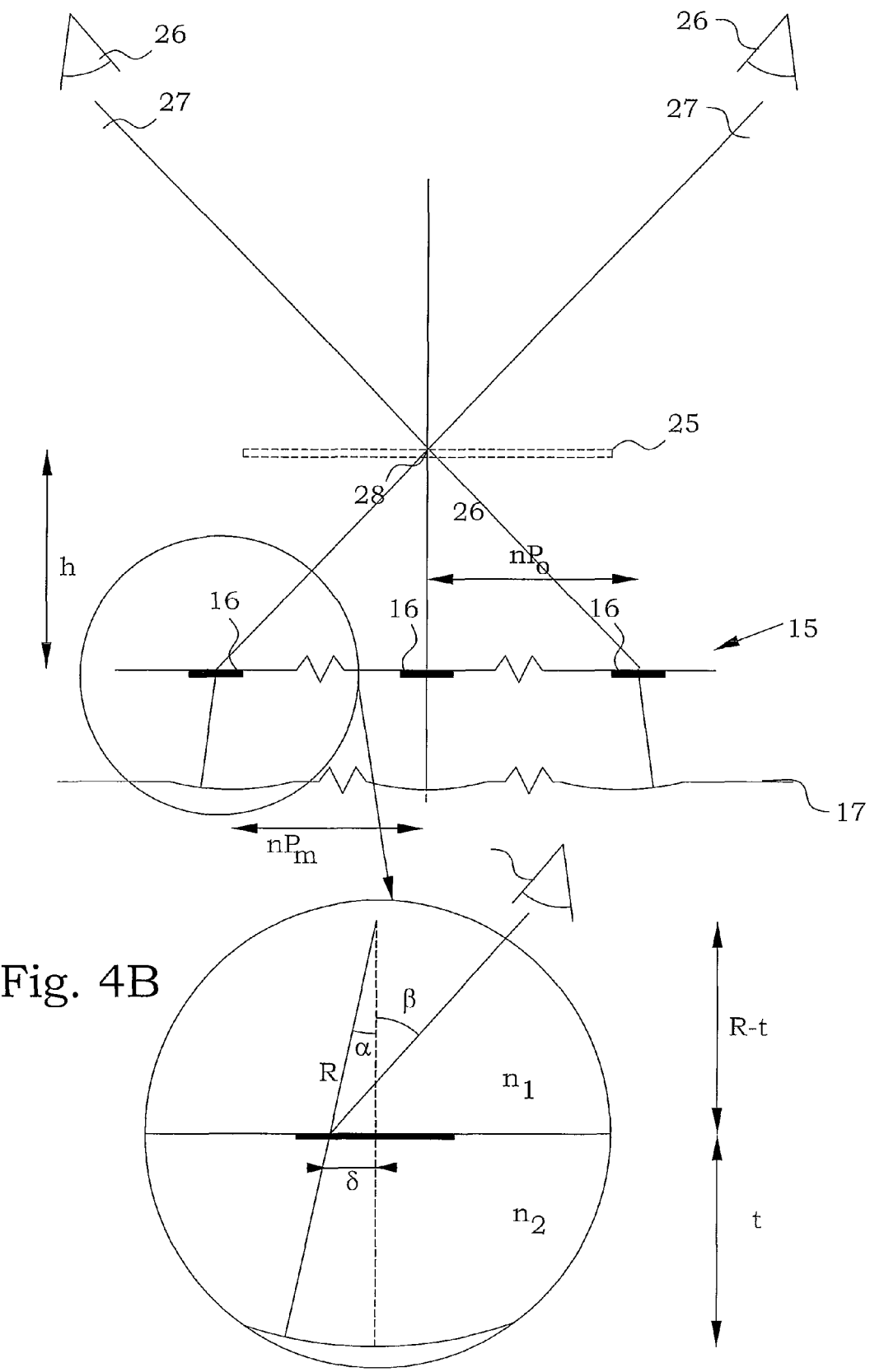

Also in the case of mirrors as focussing elements, the synthetic image can be constructed in such a way that it floats over the surface of the optical device by changing the periodicities and letting the icon period $P_o$ become larger than the mirror period $P_m$. This is illustrated in FIG. 4B, and gives the height h:

$$h = \frac{P_o(R-t)}{n_2(P_o - P_m)}. \tag{22}$$

A third example of an array of focusing elements that can be used to form a synthetic image is an array of small apertures. Such arrangement will operate more or less as an array with lenses, but with much lower light throughput.

In the above examples, a certain icon period has been assumed, i.e. the icons are provided in a repetitive manner. This gives an opportunity to easily derive equations for the apparent depth/height that assists in the understanding of how such a device may function. However, there are also optical devices giving rise to synthetic images with depth and/or height that comprise non-repetitive icons. The configuration of the icons are then performed in such a way that the imaged parts of the icons are combinable over the surface of the optical device such that a synthetic image is created, which thus in the general case in non-repetitive.

There are thus different manners to produce synthetic images that have an apparent depth below or height above the surface of the device giving rise to the image.

A three-dimensional image can generally be considers as an amount of data spread out in three dimensions. The position and the actual image content in each point together form a data entity. Any two-dimensional cut through such a three-dimensional image is then associated with a selected of certain of the data in the entire image. Such a cut could be a flat plane or a curved plane. The information selection can be seen as an assistance to retrieve some data from the enormous total data content in the three-dimensional image. This selection can then be a part of e.g. an authentication method.

Figure 5:
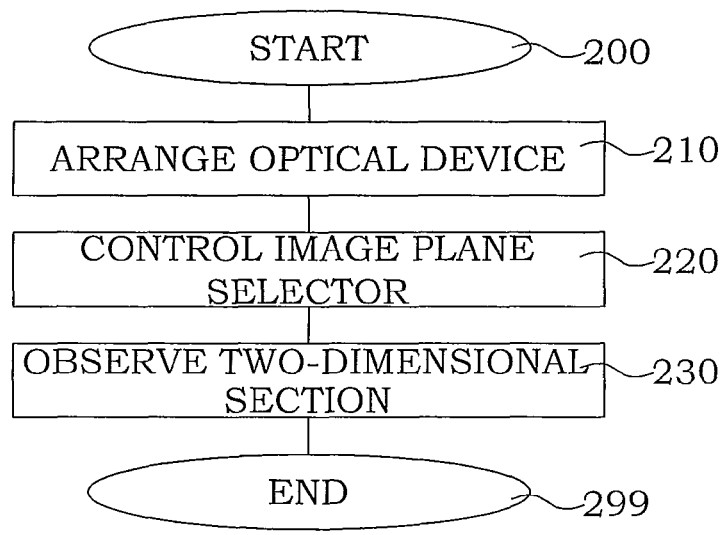
FIG. 5 is a flow diagram of steps of an embodiment of a method according to the present invention.

FIG. 5 illustrates a flow diagram of steps of an embodiment of a general method according to the present invention. The method for enabling reading of an optical device having a two-dimensional array of focusing elements and being configured to provide a synthetic image, starts in step 200. In step 210, the optical device is arranging to obtain a first predetermined shape. In step 220, an image plane selector is controlled to select an image plane at a first position above a surface of the optical device. In such a way an observable two-dimensional section of the synthetic image taken at the selected image plane is provided. The image plane selector comprises a diffusing screen. The step of controlling then comprises a step of moving the diffusing screen to the image plane at the first position above the surface of the optical device. In step 230, the observable two-dimensional section of the synthetic image is observed. The procedure ends in step 299.

Figure 6:
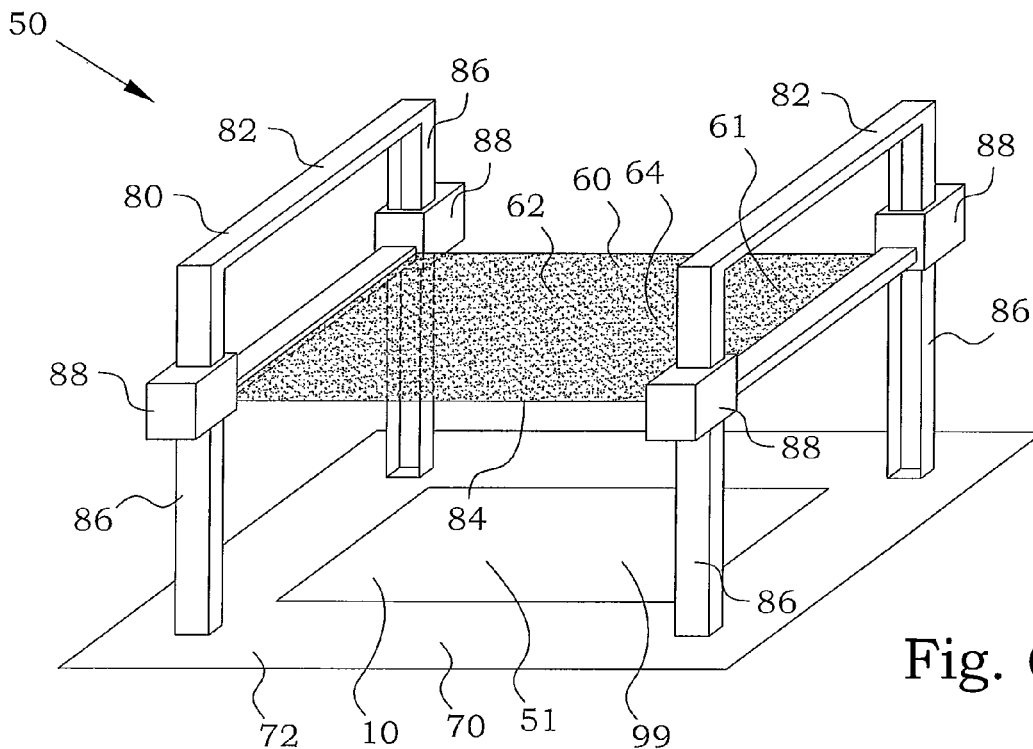
FIG. 6 is a schematic illustration of an embodiment of a device according to the present invention.

FIG. 6 illustrates a schematic illustration of an embodiment of a general device for reading of three-dimensional synthetic images. A device 50 for enabling reading of an optical device 10 comprises an image plane selector 60 in the form of a diffusing screen 62, a support structure 70 and an image plane controller 80. The optical device 10 has a two-dimensional array of focusing elements 99 and is configured to provide a synthetic image, e.g. according to the above described examples. The support structure 70 is arranged for supporting the image plane selector 60 relative to the optical device 10 arranged in a predetermined shape. In the present embodiment, the optical device 10 is placed on top of a surface 72 of the support structure 70. In this embodiment, the surface 72 is a plane surface and consequently the predetermined shape of the optical device 10 is flat.

The image plane controller 80 is configured to control the image plane selector 60 so as to select an image plane 64 at a position above a surface 51 of the optical device 10. An observable two-dimensional section of the synthetic image taken at that selected image plane is thereby provided for a viewer. The image plane selector is a diffusing screen 62, whereby the image plane 64 becomes the plane of the diffusing screen 62. The diffusing screen 62 is attached to a holder 84, which in turn is slidably engaged with girders 86 of a frame 82 provided from the surface 72 and upwards. The diffusing screen 62 can thereby be moved up or down until the requested image plane 64 is coinciding with the diffusing screen 62. Clamps 88 are provided between the holder 84 and each girder 86 to maintain the position of the holder when the movement is ended.

Figure 7A:
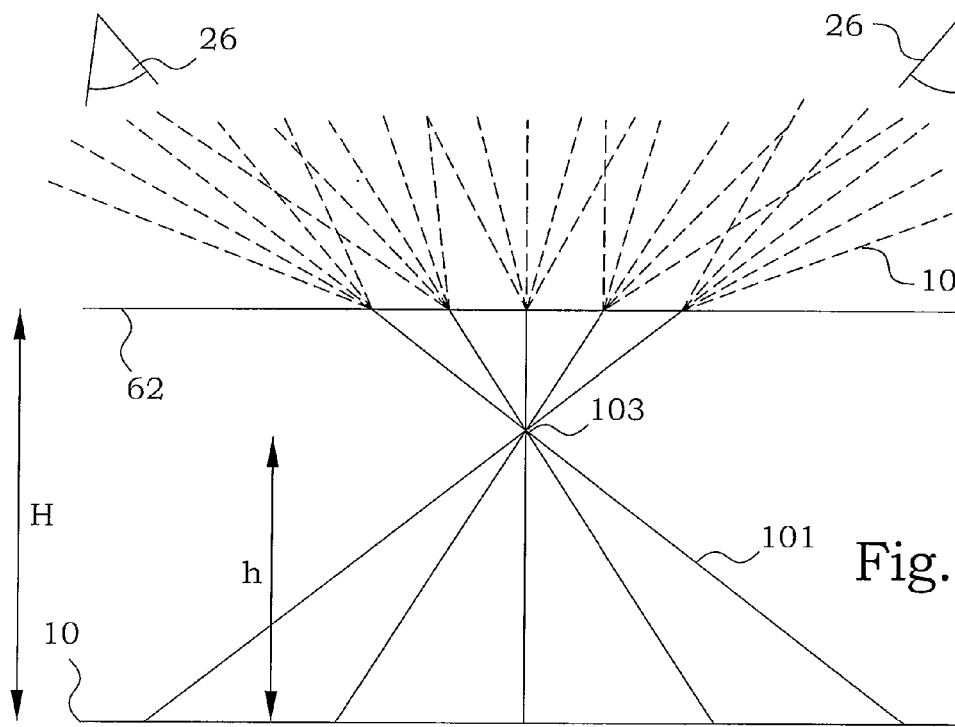
FIGS. 7A-C illustrate the use of a diffusion screen as image plane selector.
Figure 7B:
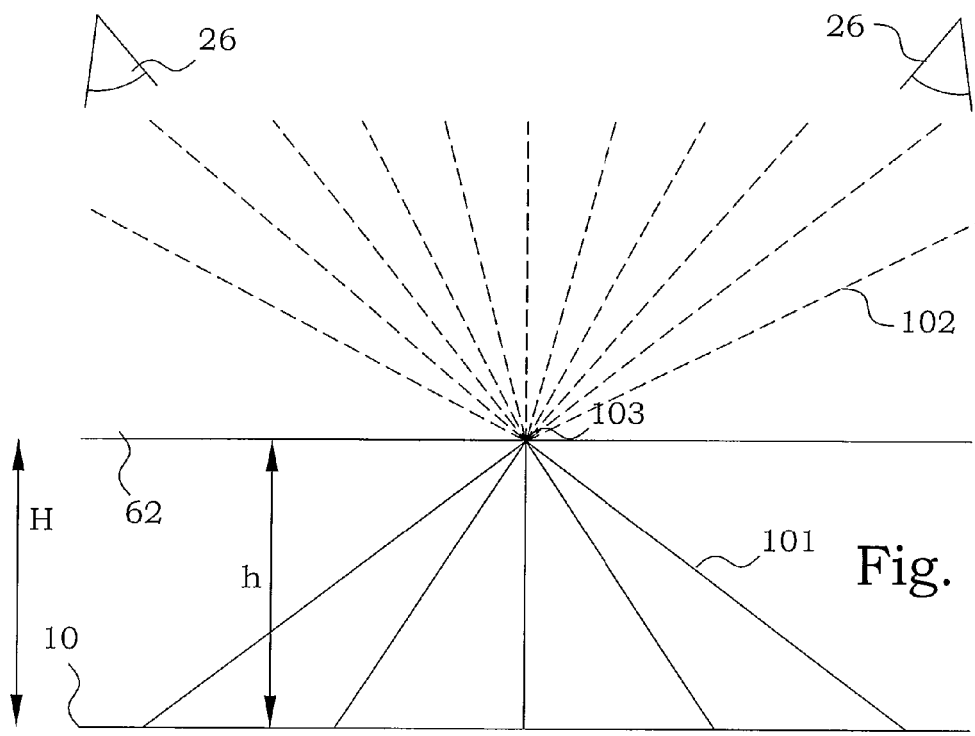
Figure 7C:
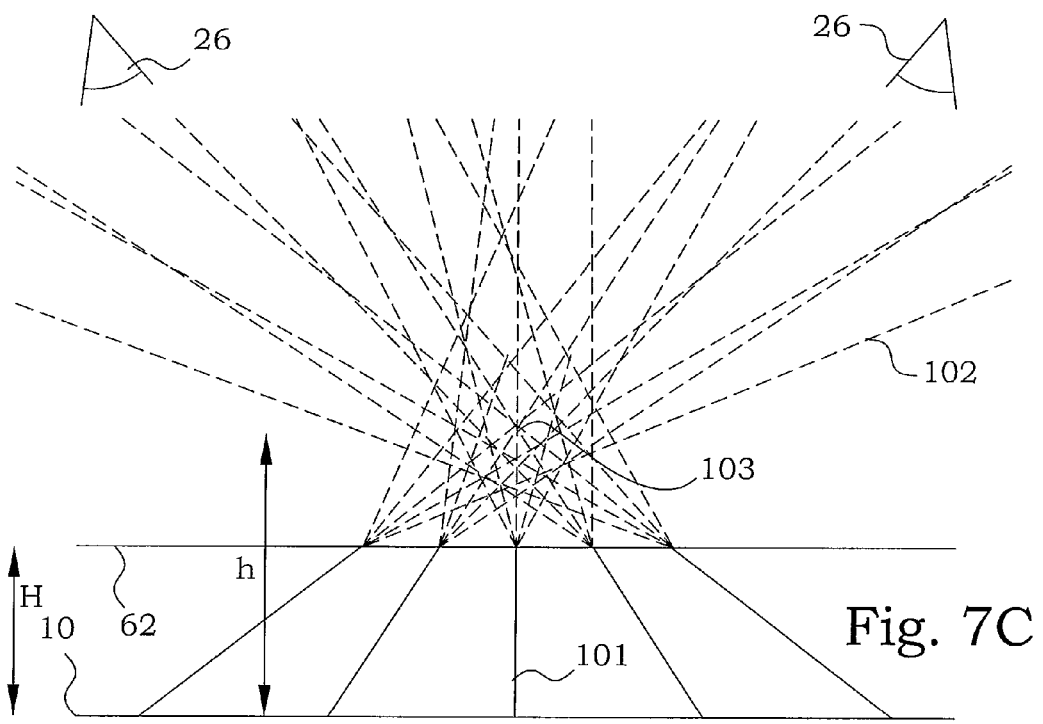

FIGS. 7A-C illustrate how the diffusing screen 62 operates as an image plane selector 60. From elements in the optical device 10, light rays 101 are emitted, intended to reach the eyes 26 of a viewer. A point 103 of the three-dimensional image has an apparent height h over the surface of the optical device 10. All individual rays contributing to this part of the image therefore converge into the point 103 before reaching the eyes 26. In FIG. 7A, a diffusing screen 62 is inserted between the viewer and the optical device at a height H that is larger than the apparent height h of the point 103. All light reaching the diffusing screen 62 will be scattered as part rays 102 in different directions. In a preferred embodiment, the distribution of the light is essentially homogeneous over the entire half-sphere above the diffusing screen 62. Part rays 102 from different lateral positions of the diffusing screen 62 will reach the eyes 26 of the viewer and the image of the point 103 therefore becomes "smeared out" over essentially the entire surface of the diffusing screen 62.

In FIG. 7B, the diffusing screen 62 is placed at the same height H as the apparent height h of the point 103. Since all rays contributing to the point 103 passes one and the same point at this height h, only one point at the diffusing screen 62 will be hit and any light reaching the eyes 26 of the viewer will always come from one and the same spot on the diffusing screen 62. The sharpness of that point will therefore be much less degraded than in FIG. 7A. The point 103 is therefore still seen in a clear view by the viewer.

In FIG. 7C, the diffusing screen is brought down to a height H below the height h of the point 103. The situation will be analogue to the one in FIG. 7A and a diffuse general smeared out image will be the result of the rays intended to build the image at the point 103. In this manner, the position of the diffusing screen 62 determines which image points that will be seen as a clear image.

Figure 8:
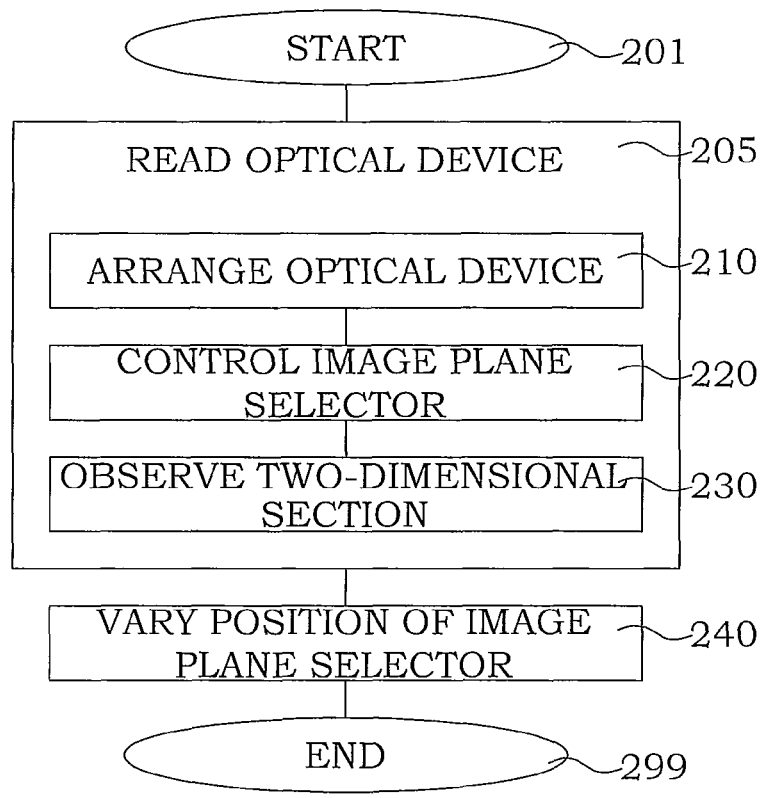
FIG. 8 is a flow diagram of steps of another embodiment of a method according to the present invention.

The height selection is rather sensitive. The reading approach according to the present invention can therefore by advantage be used for measuring distances. FIG. 8 is a flow diagram of steps of an embodiment of a height measuring method according to the present invention. The method for finding a predetermined distance from an object surface starts in step 201. In step 205, an optical device is read according to the principles described here above. For this particular application, the arranging of the optical device is performed onto the object surface from which the height is going to be determined. The optical device is furthermore configured to provide a predetermined section of the synthetic image at a certain apparent image height above the surface of the optical device that corresponds to the predetermined distance. In step 240, the position of the image plane selector is varied until the predetermined section of the synthetic image is observable. The position of the image plane then corresponds to the predetermined distance. The procedure ends in step 298.

Figure 9:
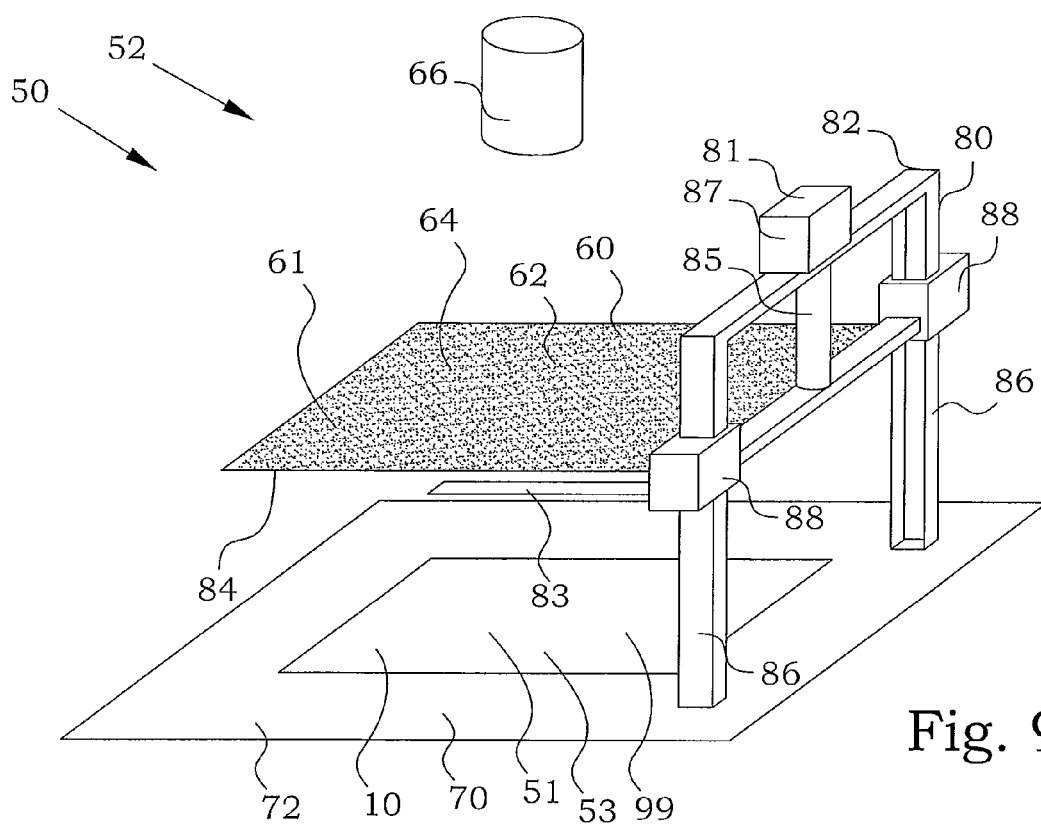
FIG. 9 is a schematic illustration of another embodiment of a device according to the present invention.

FIG. 9 illustrates a schematic drawing of an embodiment of a distance meter 52 for finding a predetermined distance from an object surface 53 according to the present invention. The optical device 10 is provided at the object surface 53. The optical device 10 is furthermore configured to provide a predetermined section of the synthetic image at a certain apparent image height above the surface of the optical device 10 that corresponds to the predetermined distance. It resembles the device of FIG. 6, but this embodiment comprises only one pair of girders 86. The precision of the fitting of the holder 84 into the girders 86 is here better, by use of bearings, in order to ensure a high positioning accuracy. In this embodiment, the diffusing screen 62 is a frosted foil 61 attached to the frame 82 connected to the support structure 70. A micromotor 81 controls the position of the image plane selector 60 by means of a threaded rod 85. The micromotor 81 and the threaded rod 85 together constitutes a translator 87, which thus is configured to mechanically control a distance between the frame 82 and the surface of the optical device 10. Furthermore, a height indicator 83 is provided at the same height as the image plane selected by the image plane selector 60. The micromotor 81 is turned until the predetermined section of the synthetic image is observable. The height indicator 83 then marks the position of the predetermined distance from the object surface 53. In a more elaborate embodiment, an image detector 66, e.g. a CCD camera, is arranged to record the selected two-dimensional section of the synthetic image that is provided at the selected image plane. The recorded image of the image detector 66 can be automatically analysed. The control of the micromotor 81 can further be connected to the image analyser. When a predetermined image appears, the micromotor 81 can be stopped. Fine adjustments can then be performed by controlling the motor to fine adjust the image plane selector 60 until a sharpest possible image is obtained.

By having an optical device 10 that gives rise to structures at different apparent heights, one may select between a number of predetermined distances to be determined.

Figure 10A:
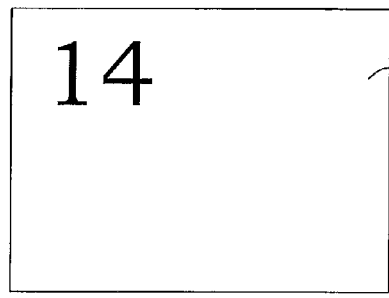
FIGS. 10A-D are illustrations of selected image planes for distance measurement purposes.
Figure 10B:
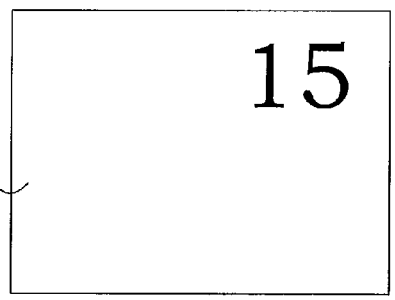
Figure 10C:
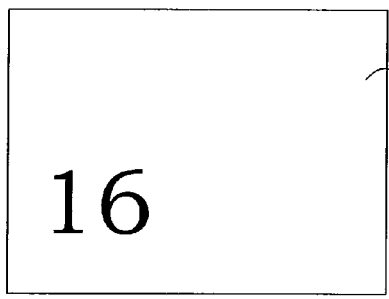
Figure 10D:
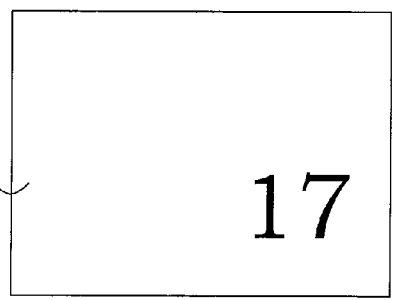

FIG. 10A-D illustrate images seen at the selected image plane for different heights. In this embodiment, the optical device is configured in such a way that a number "14" has an apparent height position of 14 mm above the optical device, or rather the bottom plane of the optical device. The optical device is further configured in such a way that a number "15" has an apparent height position of 15 mm, a number "16" has an apparent height position of 16 mm, and a number "17" has an apparent height position of 17 mm above the optical device. When the image plane is selected to be situated 14 mm above the object surface, the image of FIG. 10A is observable, presenting a sharp "14". When the image plane is selected to be situated 15 mm above the object surface, the image of FIG. 10B is observable, presenting a sharp "15". When the image plane is selected to be situated 16 mm above the object surface, the image of FIG. 10C is observable, presenting a sharp "16". When the image plane is selected to be situated 17 mm above the object surface, the image of FIG. 10D is observable, presenting a sharp "17". Anyone skilled in the art realizes that by configuring the optical device in suitable ways, various height measurement options are possible.

A structure in a three-dimensional image may give a rather complex impression. Certain small features may be difficult to distinguish within a complex three-dimensional image only by use of the human eye (and brain). This possibility to "hide" certain structures within another picture may be utilized e.g. for authentication purposes. These properties can be further enhanced by arranging the authentication structure in a curved two-dimensional plane. This further enhances the difficulties for the eye and brain to "extract" it from the three-dimensional image.

Figure 11:
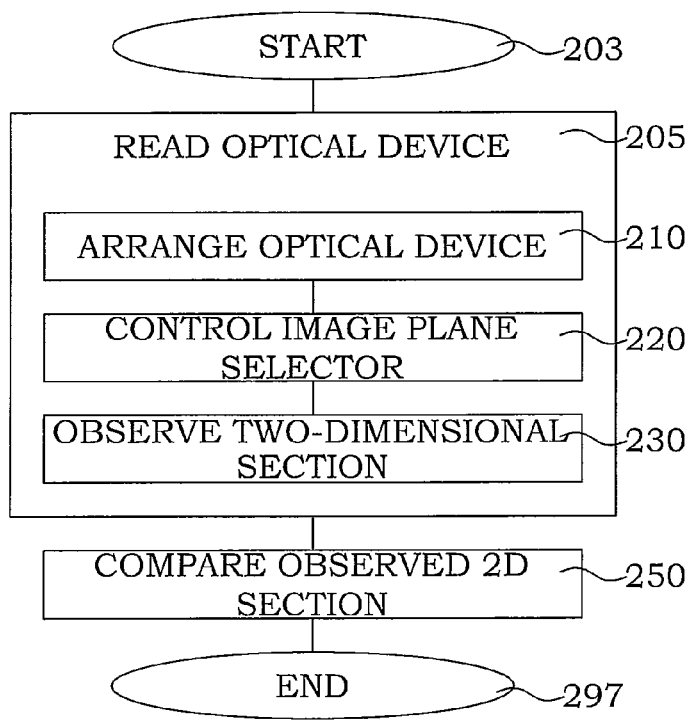
FIG. 11 is a flow diagram of steps of yet another embodiment of a method according to the present invention.

FIG. 11 is a flow diagram of steps of an embodiment of an authentication method according to the present invention. The method for authentication starts in step 203. In step 205, an optical device is read according to the principles described here above. For this particular application, the optical device is attached to an object to be authenticated. In step 250, the observed two-dimensional section of the synthetic image is compared with a predetermined two-dimensional image for verifying an authenticity of the object. The procedure ends in step 297.

Figure 12:
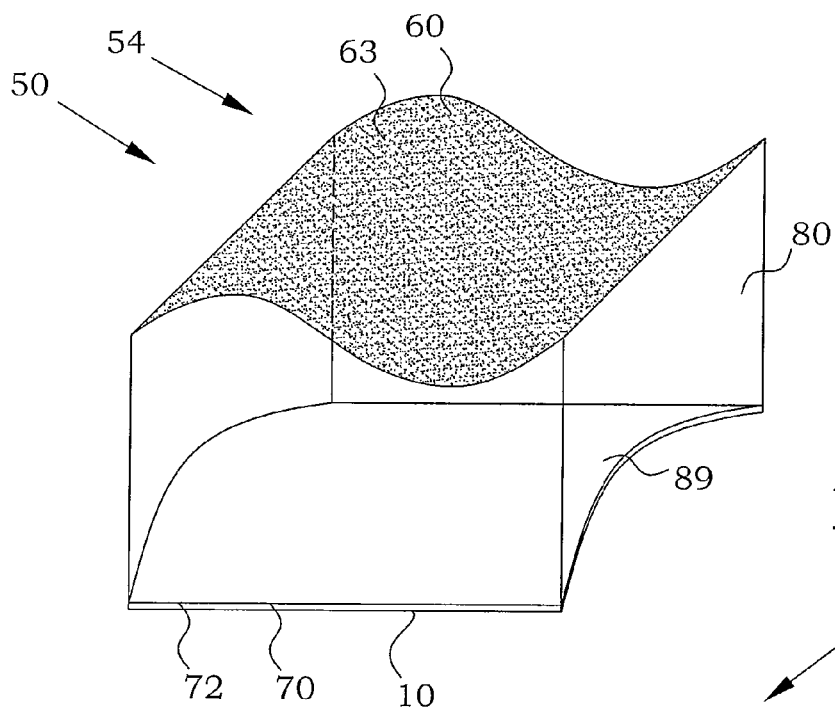
FIGS. 12-13 are schematic illustrations of yet other embodiments of a device according to the present invention.

FIG. 12 illustrates an embodiment of a simple device 50 for enabling reading of an optical device 10 in the form of an authenticity verifier 54. The authenticity verifier 54 presents an image plane controller 80, in this particular embodiment in the form of a solid glass block 89, an image plane selector 60, in this particular embodiment a frosted surface 63 of the solid glass block 89, and a support structure 70, in this particular embodiment a lower surface 72 of the solid glass block 89. The optical device 10 is held against the lower surface 72, thereby obtaining a predetermined shape. The frosted surface 63 has another predetermined shape provided at a predetermined position relative the lower surface 72. An image of the curved two-dimensional selected image plane can be seen at the frosted surface 63, and authenticity can be determined if the shown image corresponds to a predetermined image. In this embodiment, both the image plane and the optical device have curved shapes. However, as anyone skilled in the art understands, one or both of them can also be flat. In this view, the image plane selector 60 is thus a diffusing surface, in this case a frosted surface 63, of a transparent rigid body, in this case the solid glass block 89. The support structure 70 is a surface 72 of the transparent rigid body, opposite to the diffusing surface. The image plane controller 80 is constituted by the transparent rigid body itself.

Figure 13:
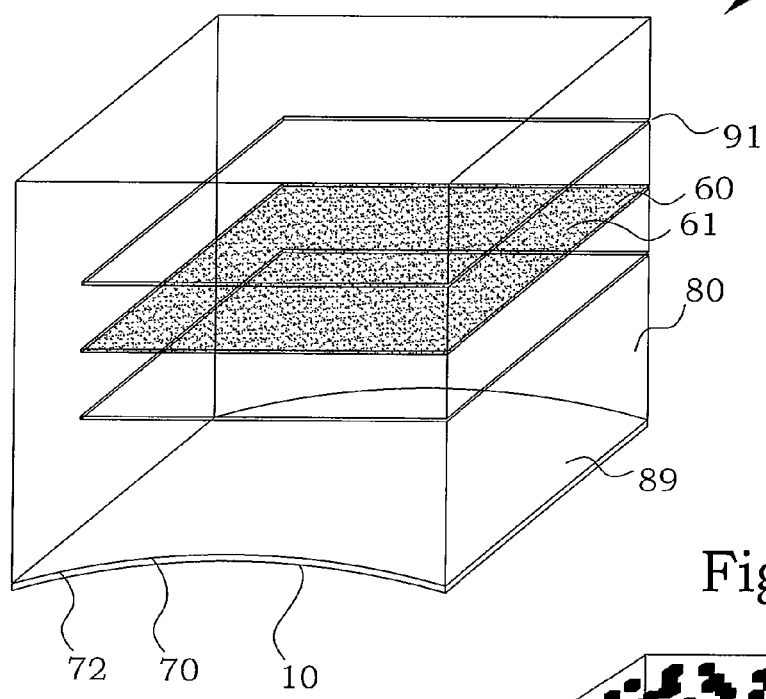

FIG. 13 illustrates another embodiment of an authenticity verifier 54. In this embodiment, a solid glass block 89 is provided with a number of slots 91, into which a frosted foil 61 can be stuck. The optical device 10 is held against the bottom surface 72 of the glass block 89 and a two-dimensional image selected by the frosted foil 61 can be viewed from above. By moving the frosted foil 61 to another slot 91, image planes at different positions relative to the optical device 10 can be selected.

As anyone skilled in the art understands, an analogue device, where the position of the optical device instead is shifted relative to a stationary image plane selector, is feasible, as well as a device in which the position of both the optical device and the image plane selector can be changed.

Figure 14A:
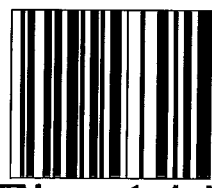
FIGS. 14A-C are illustrations of information patterns in one, two and three dimensions.
Figure 14B:
Figure 14C:
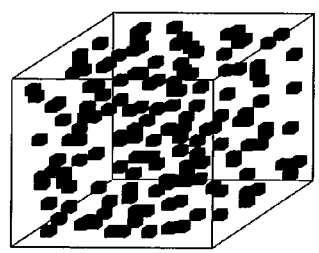

During the last years, bar codes, such as schematically illustrated in FIG. 14A, are used in many different applications to provide a compact and reliable way to provide data. Also a two-dimensional analogy is used, where points over a surface, such as illustrated in FIG. 14B, represent different kinds of data. These principles can also be expanded into three dimensions. By having an optical device providing a synthetic three-dimensional image, different lateral and height positions can be used to represent data, as schematically illustrated in FIG. 14C. However, such three-dimensional data representations are difficult to interpret directly in three dimensions. Instead, according to the basic principles of the present invention, interpretation of such three-dimensional data representations can be performed by successively extract information of different two-dimensional image planes.

Figure 15:
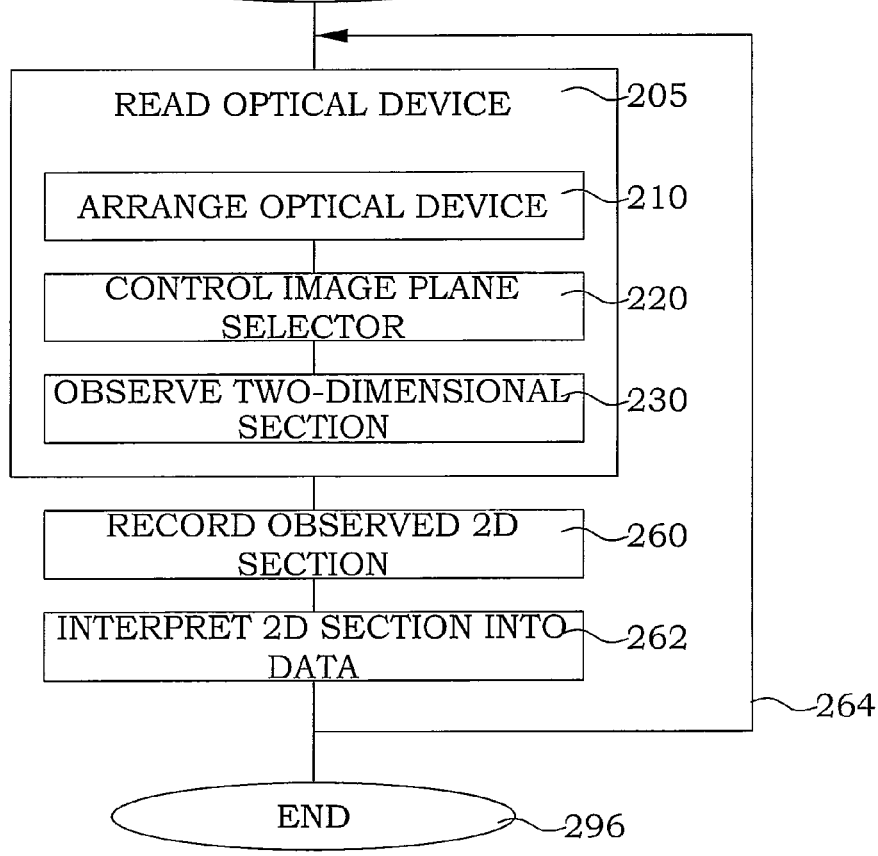
FIG. 15 is a flow diagram of steps of yet another embodiment of a method according to the present invention.

FIG. 15 is a flow diagram of steps of an embodiment of an information decoding method according to the present invention. The method for information decoding starts in step 204. In step 205, an optical device is read according to the principles described further above. For this particular application, the optical device is configured to provide predetermined sections of the synthetic image at different apparent image heights above the surface of said optical device. In step 260, the observed two-dimensional section of the synthetic image is recorded. In step 262, the recorded two-dimensional section is interpreted into data. The steps of reading 205, recording 260 and interpreting 262 are repeated for a plurality of different image plane positions, as indicated by the arrow 264. The procedure ends in step 296.

Figure 16:
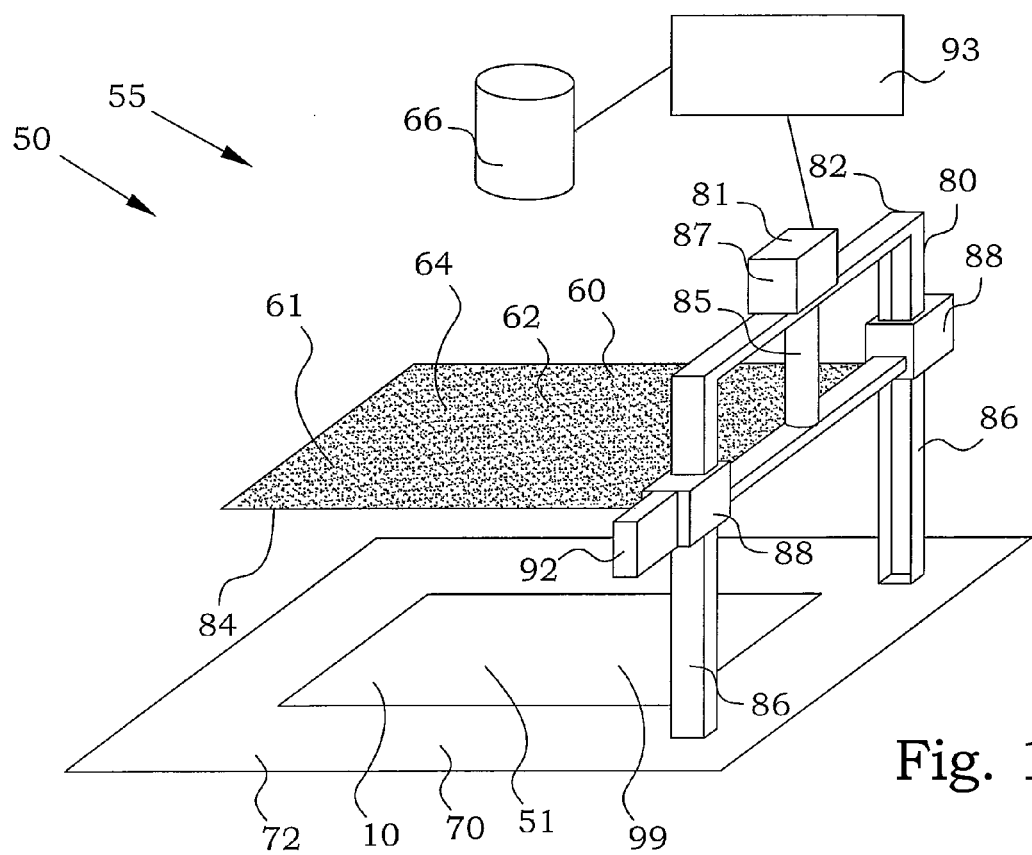
FIG. 16 is a schematic illustration of yet other embodiment of a device according to the present invention.

FIG. 16 illustrates a schematic drawing of an embodiment of an information decoder 55 according to the present invention. Most parts are similar to the device presented in FIG. 9. In this embodiment, the holder 84 to which the image plane selector 60 is attached also comprises a distance meter 92, which is configured to measure the distance to the object surface 53. The micromotor 81 is controlled to move the holder 84 until a predetermined distance is reached. The image detector 66 records the two-dimensional image that appears at the image plane selector 60, which then is a selected image section within the three-dimensional synthetic image. The micromotor 81 is controlled to move the holder to another distance and another image is recorded. The recorded images are provided to an image interpreter 68, in which the recorded two-dimensional image is interpreted coded information comprised in the recorded two-dimensional section of the synthetic image into data. In such a way, the data content represented by the entire three-dimensional space can be retrieved. Preferably, an automation controller 93 is connected between the image detector 66, the image interpreter 68 and the micromotor 81. The automation controller 93 is configured to cause an operation of the image plane controller 80 to select image planes at a plurality of positions and to synchronize the image detector 66 to the operation of the image plane controller 80.

In the embodiments of the present invention, optical devices producing an image that at least partially has an apparent height are of interest, i.e. it is seen as if the image is at least partly suspended over the optical device surface. This property has been utilized for extracting certain selected image planes within the so produced three-dimensional space.

In the above presented embodiments, two-dimensional arrays of focusing elements are used. This is presently considered as the preferable embodiments. Most of the effects are, however, also possible to achieve by one-dimensional arrays of focussing elements, such as e.g. lenticular lenses, cylindrical mirrors etc. The spatial effects are then utilised in the direction transverse to the extension of the focusing elements. Such devices are, however, in general sensitive to the direction relative a viewer and the benefits are therefore less pronounced for such focussing element alternatives.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for authentication, comprising the steps of:
   reading an optical device being configured to provide a synthetic image, said step of reading the optical device comprising:
      arranging said optical device, having an array of focusing elements and an array of icons, wherein said array of icons is positioned in a vicinity of a focal plane of said array of focusing elements, to obtain a first predetermined shape,
      controlling an image plane selector to select an image plane at a first position relative a surface of said optical device, thereby providing an observable two-dimensional section of said synthetic image taken at said selected image plane, while diffusing images of other image planes,
         wherein said image plane selector is a diffusing screen, and
         wherein said step of controlling comprises a step of moving said diffusing screen to said image plane at said first position above said surface of said optical device, and
      observing said observable two-dimensional section of said synthetic image, said optical device being attached to an object to be authenticated; and
   comparing said observed two-dimensional section of said synthetic image with a predetermined two-dimensional image for verifying an authenticity.

2. The method for authentication according to claim 1, wherein said array is a two-dimensional array.

3. The method for authentication according to claim 1, wherein said first predetermined shape is a curved shape.

4. The method for authentication according to claim 1, wherein said image plane has a second predetermined shape in relation to said optical device, said second predetermined shape is a curved shape.

5. An authenticity verifier, the authenticity verifier comprising:
   a device for enabling reading of an optical device being configured to provide a synthetic image, and the device for enabling reading of the optical device comprises:
      an image plane selector,
      a support structure,
      said support structure being arranged for supporting said image plane selector relative to said optical device, having an array of focusing elements and an array of icons, wherein said array of icons is positioned in a vicinity of a focal plane of said array of focusing elements, arranged in a first predetermined shape, and
      an image plane controller, configured to control said image plane selector to select an image plane at a first position relative a surface of said optical device, thereby providing an observable two-dimensional section of said synthetic image taken at said selected image plane, while diffusing images of other image planes,
      said image plane selector comprises a diffusing screen, whereby said image plane is the plane of the diffusing screen, and
      wherein said image plane selector is a diffusing surface of a transparent rigid body, said support structure is a surface of said transparent rigid body, opposite to said diffusing surface, and said image plane controller is the transparent rigid body itself.

6. The authenticity verifier according to claim 5, wherein said array is a two-dimensional array.

7. The authenticity verifier according to claim 5, wherein said support structure comprises a holder for holding said optical device in said first predetermined shape.

8. The authenticity verifier according to claim 5, wherein said first predetermined shape is a curved shape.

9. The authenticity verifier according to claim 5, wherein said image plane has a second predetermined shape in relation to said optical device, said second predetermined shape is a curved shape.

10. An information decoder, comprising:
    a device for enabling reading of an optical device being configured to provide a synthetic image, the device for enabling reading comprising:
       an image plane selector,
       a support structure,
       said support structure being arranged for supporting said image plane selector relative to said optical device, having an array of focusing elements and an array of icons, wherein said array of icons is positioned in a vicinity of a focal plane of said array of focusing elements, arranged in a first predetermined shape, and
       an image plane controller, configured to control said image plane selector to select an image plane at a first position relative a surface of said optical device, thereby providing an observable two-dimensional section of said synthetic image taken at said selected image plane, while diffusing images of other image planes,
       wherein said image plane selector comprises a diffusing screen, whereby said image plane is the plane of the diffusing screen, and
       an image detector, arranged to record a two-dimensional section of said synthetic image being provided at said selected image plane; and an image interpreter, configured to interpret coded information comprised in said recorded two-dimensional section of said synthetic image.

11. The information decoder according to claim 10, further comprising an automation controller configured to cause an operation of said image plane controller to select image planes at a plurality of positions and to synchronize said image detector to said operation of said image plane controller.

12. The information decoder according to claim 10, wherein said array is a two-dimensional array.

13. The information decoder according to claim 10, wherein said support structure comprises a holder for holding said optical device in said first predetermined shape.

14. The information decoder according to claim 10, wherein said first predetermined shape is a curved shape.

15. The information decoder according to claim 10, wherein said image plane has a second predetermined shape in relation to said optical device, said second predetermined shape is a curved shape.

\* \* \* \* \*